Jan. 20, 1948. D. D. WALLER 2,434,752
AIR DUCT SYSTEM FOR AIRCRAFT
Filed March 10, 1945 3 Sheets-Sheet 3
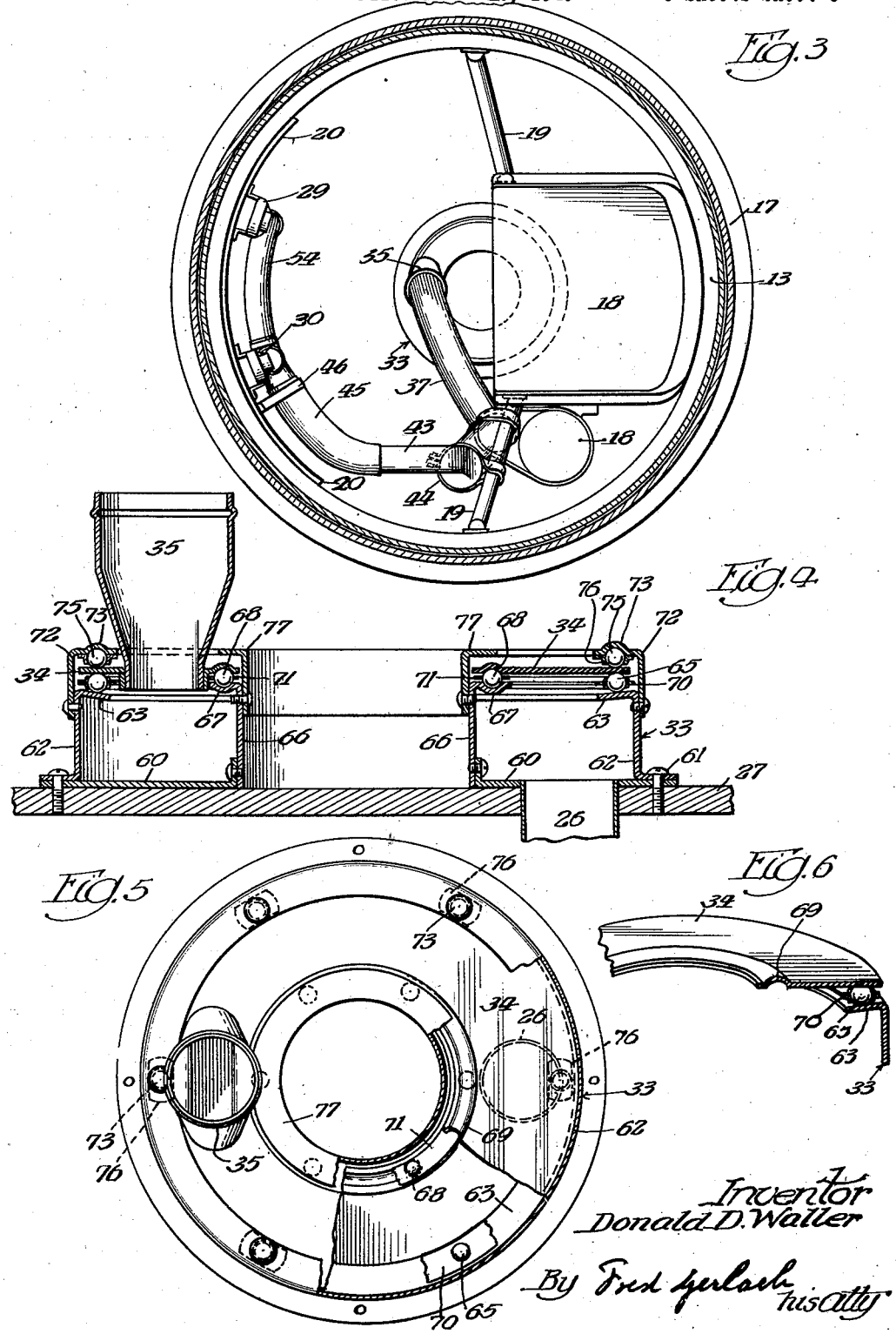
Inventor
Donald D. Waller
By Fred Gerlach
his Atty Patented Jan. 20, 1948

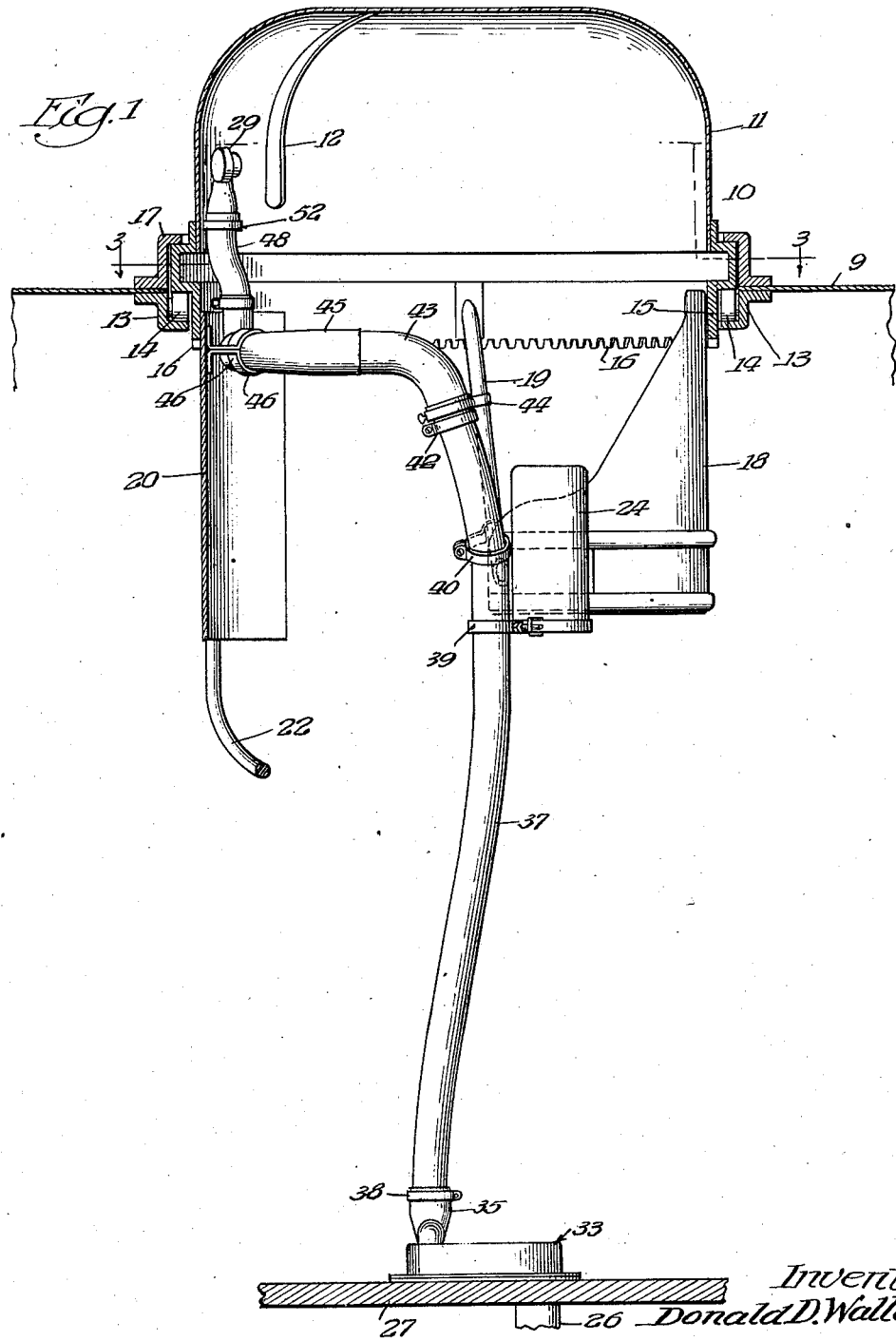

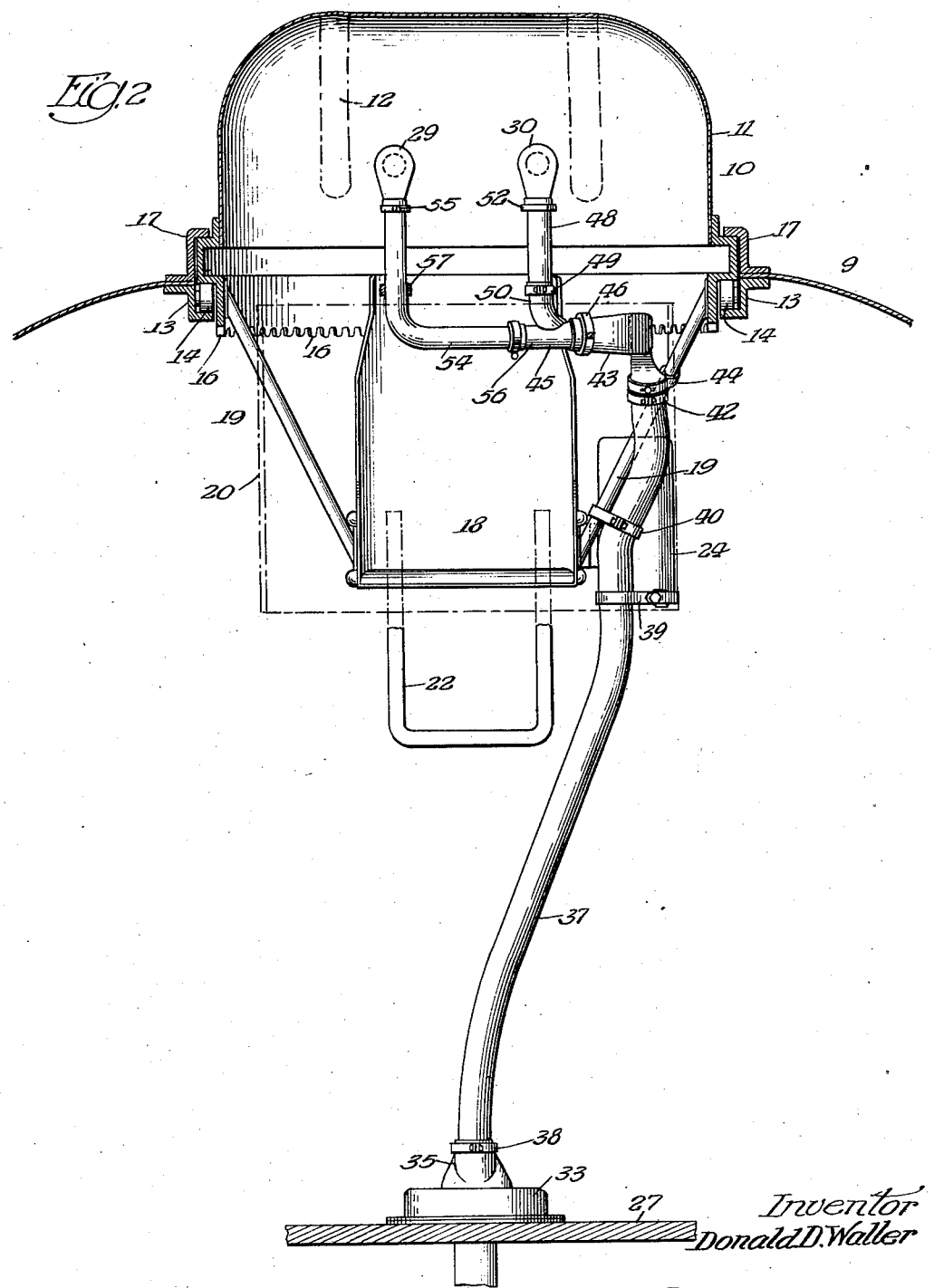

2,434,752

UNITED STATES PATENT OFFICE 2,434,752

AIR DUCT SYSTEM FOR AIRCRAFT

Donald D. Waller, Fort Worth, Tex., assignor to Consolidated Vultee Aircraft Corporation, San Diego, Calif., a corporation of Delaware Application March 10, 1945, Serial No. 582,076

6 Claims. (Cl. 98—1)

The invention relates to air ducts for rotatable turrets used in aircraft.

In gun turrets used in aircraft the necessity of the gunner's seat, firearms, electrical instruments, such as switches, potentiometers, ammunition boxes, turret motor and other devices leave little and non-symmetrical spaces for the installation of an air duct for delivering heated or non-heated air to the turret. This necessitates flexible pipes for delivering air from a stationary connection for the air supply to the discharge nozzles located in and rotatable with the turret.

One object of the invention is to provide a construction of air duct for use in gun turrets which can be installed without interference with the operation and location of the other necessary equipment in the turret and which during the rotating of the turret will maintain communication with the stationary source of supply of air.

Another object of the invention is to provide an air duct system for gun turrets which includes a flexible conduit or pipe which will be subjected to minimum torque, while the turret is in different rotative positions.

Other objects of the invention will appear from the detailed description.

The invention consists in the several novel features hereinafter set forth and more particularly defined by claims at the conclusion hereof.

In the drawings:

Fig. 1 is a vertical longitudinal section through a gun turret in an airplane provided with an air duct embodying the invention.

Fig. 2 is a transverse section taken on line 2—2 of Fig. 1.

Fig. 3 is a horizontal section taken on line 3—3 of Fig. 1, the fuselage being omitted.

Fig. 4 is a vertical section of the stationary and rotatable members of the air conducting means for maintaining communication for the delivery of air to the discharge nozzles in different rotative positions of the turret.

Fig. 5 is a plan of the parts shown in Fig. 4, parts being broken away for illustrative purposes.

Fig. 6 is a sectional perspective of the rotatable ring in the air casing.

The invention is exemplified in an airplane which includes a fuselage 9 and provided with a rotatable turret, generally designated 10, which carries a dome 11 which is provided with slots 12 through which the guns (not shown) are fired. A ring 13 is fixedly secured to the fuselage and forms a circular track for rollers 14 on which a ring 15 which forms a part of the turret is rotatably supported. A ring 17 secured on the fuselage has an upper flange for engaging the ring 15 and holding it on the rollers 14. The turret is usually rotated by power mechanism and gearing which is adapted to drive a gear 16 on the ring 15, and may be of any suitable construction as well understood in the art.

The turret is equipped with a seat 18 which is rotatable therewith for the gunner. The back of the seat is secured to the turret-ring 15 and said seat is also supported by braces 19 between the seat and said ring. A segmental cylindrically curved sheet of armour plate 20 has its upper end secured to the inner periphery of ring 15 and depends therefrom for the protection of the gunner in the seat 18. A stirrup 22 is fixedly secured to and depends from the plate 20 and serves as a footrest for the gunner. One of the motors 24 of the equipment of the turret, such as the azimuth motor generator, is secured to and supported from one side of the seat. The equipment of the turret, such as the necessary switches, controls, clutch levers, motors, service-connections and other devices are located in the turret. This necessary equipment in the turret, which is rotatable therewith, and the space required for the gunner and operation of the controls, are omitted for clarity in illustration, but leave little available space for the installation of the air duct.

The turret is equipped with means for discharging air into the upper portion of the turret, which air may be heated or unheated, and may be used for ventilating the turret or for defrosting. A supply connection for the air comprises a pipe 26 which is connected to a suitable course of air supply, extends through the stationary floor 27 in the fuselage under the turret, and air is conducted from pipe 26 to a pair of nozzles 29 and 30 which are disposed in the dome 11 for discharging air into the dome of the turret. The nozzles 29 and 30, preferably discharge air toward the gunner, and are rotatable with the turret. The means for conducting air from the pipe 26 which is fixed in the stationary floor 27 to the nozzles 29 and 30 delivers air from the stationary pipe 26 which is disposed under the gunner's seat 18, extends vertically and around the side of said seat, so as to leave the space in the turret forwardly of the seat available for the movements of the gunner and other necessary equipment and extends thence upwardly and laterally in the turret to the front of the seat where the nozzles are disposed to discharge air rearwardly. This arrangement of the conduit eliminates interference with the operations of the gunner in controlling the turret, the equipment thereon and the guns and provides a continuous connection between the supply pipe for air from the supply pipe 26 to the nozzles 29 and 30 in different rotatable positions of the turret.

The supply pipe 26 delivers air into an annular casing 33 in which is rotatably mounted a circular plate 34. A tubular member 35 has its open lower end fixed in plate 34 which is rotatable and communicatively connected with the chamber in casing 33. A flexible pipe 37 is secured by a suitable clamp 38 to the upper end of tubular member 35. Flexible pipe 37 extends upwardly from casing 33 and is secured by a band or strap 39 to the motor 24 and is also supported by a clip 40 extending around one of the seat-braces 19. The upper end of flexible pipe 37 is secured by a hose clamp 42 to an elbow fitting 43 of metal which is secured by a clip 44 to a seat-brace 19. The fitting 43 is communicatively connected to a header or fitting 45 of metal which is supported by a band 46 from the plate 20 at the front of the turret. A flexible pipe section 48 is connected by a clamp 49 to an upwardly extending branch 50 of the header 45 and nozzle 30 is secured by a clamp 52 to the upper end of the flexible pipe section 48. A flexible pipe section 54 is connected by a clamp 55, to a second branch 56 of fitting 50 and discharge nozzle 29 is connected to flexible pipe 54 by a clamp 55. Flexible pipe section 54 is angular and may be supported from the ring 15 by a band 57. These flexible pipe sections and fittings exemplify a conduit which is rotatable with the turret for conducting air from the stationary casing 33 on the floor of the turret around one side of the seat and two nozzles in front of the seat, so as to avoid interference with the location of the elements of the equipment in the turret and their operation by the gunner.

The stationary casing 33 comprises an annular base plate 60 which is secured by screw 61 to the stationary floor 27, an outer annular wall 62 having a flange secured to base-plate 60 and an inturned inwardly and downwardly inclined flange 63 which forms a lower race for a series of anti-friction bearing-balls 65, and an inner cylindrical wall 66 which is provided with a flange 67 having a concave annular groove therein which forms a lower race for a series of bearing-balls 68. The outer margin of circular plate 34 which carries the tubular outlet-member 35 rests on balls 65, and its inner margin is formed with an annular concave groove 69 which rests on balls 68. A retainer ring 70 holds balls 65 in circumferentially spaced relation and a retainer ring 71 holds balls 68 in circumferentially spaced relation. A ring 72 has a cylindrical flange which is riveted to the outer wall 62 and a horizontal flange provided with concave pockets 73 over plate 34 in which a series of balls 75 are held by retainers 76, for engaging the plate 34 to prevent it from tilting. A ring 77 which is angular in cross-section is secured to the inner wall 66 of the casing 33. Rings 72 and 77 enclose the ball bearings between the plate 34 and the casing 33. The space between rings 72 and 77 permits the tubular member to move bodily around the vertical axis of the casing 33 with the flexible pipe 37. This construction exemplifies means for rotatably supporting the tubular member 35 so that the said member may rotate freely in casing 33 around the vertical axis of the casing 33 responsively to movement imparted to said plate by the rotation of the turret.

In operation, air, which may be heated, is delivered by pipes 26 into casing 33 and conducted by tubular member 35, flexible pipe 37, fittings 43, 45, and flexible pipes 48 and 54 to the nozzles 29 and 30 in all rotative positions of the turret. As the turret is rotated, the flexible pipe 37 will rotate member 35 and plate 34. Very little torque will be applied to the flexible pipe 37 in the rotation of plate 34 and an even and unrestricted flow of air will be maintained to the interior of the dome 11. The plate 34 is not sealed to the casing to permit free movement of the plate, the small loss of air being inconsequential since it will be discharged into the lower portion of the turret. The lower portion of the tubular member 35 is elongated and merges into a circular upper portion to provide for maximum flow of air through said member without a large space between rings 72 and 77.

The invention exemplifies means or apparatus for supplying air to a rotatable gun turret which can be installed without interference with the equipment of a gun turret, which maintains communication with an air supply entering the turret through the stationary floor and which includes a flexible pipe which is subjected to minimum torque during rotation of the turret.

The invention is not to be understood as limited to the details described, since these may be modified within the scope of the appended claims without departing from the spirit and scope of the invention.

Having thus described the invention, what I claim as new and desire to secure by Letters Patent is:

1. Means for supplying air to a rotatable gun turret in aircraft comprising: a non-rotatably supported annular casing provided with an open top and having an air supply connected thereto; an annular plate rotatably supported in the annular casing and forming a closure for the open top of the casing; a tubular member eccentrically secured on the plate and communicatively connected to receive air from the casing in different rotative positions; and means for conducting air to the turret including a flexible pipe supported for rotation with the turret and communicatively connected to said tubular member and adapted to rotate the tubular member and ring.

2. Means for supplying air to a rotatable gun turret in aircraft comprising: a non-rotatably supported annular casing provided with an open top having an air supply connected thereto; an annular rotatable plate forming a closure for the open top of the annular casing; anti-friction bearings for rotatably supporting the plate in the annular casing; a tubular member eccentrically secured on the plate and communicatively connected to receive air from the casing in different rotative positions; and means for conducting air to the turret including a flexible pipe supported for rotation with the turret and communicatively connected to said tubular member and adapted to rotate the tubular member and the plate in the casing.

3. The combination with a rotatable gun turret in aircraft, of a system for supplying air to the turret, comprising: a conduit having its upper portion secured for bodily rotation with the turret and provided with means for discharging air into the turret, and including a lower flexible section, and an intermediate offset portion; and a casing stationarily supported on the aircraft under the turret provided with an open top and having an air supply connected thereto, and including a rotatable closure for the open top, communicatively connected to the casing and to the lower end of the flexible section and for rotation thereby for maintaining communication between the conduit and the casing during rotation of the turret.

4. The combination with a rotatable gun turret in aircraft, of a system for supplying air to the turret, comprising: a conduit having its upper portion secured for bodily rotation with the turret and provided with means for discharging air into the turret, and including a lower flexible section and an intermediate offset portion; and a casing provided with an open top, stationarily supported on the aircraft under the turret and having an air supply connected thereto, and including a rotatable closure for the open top communicatively connected to the casing and to the lower end of the flexible section, the flexible section having a portion extending tangentially of the rotatable closure for rotating the closure during rotation of the turret.

5. The combination with a rotatable gun turret in aircraft provided with a seat secured to the turret for rotation therewith, of a system for supplying air to the turret, comprising: a conduit having its upper portion secured for bodily rotation with the turret, provided with means forwardly of the seat for discharging air into the turret, and including a lower flexible and an intermediate offset portion extending along one side of the seat; and a casing provided with an open top stationarily supported on the aircraft under the turret, having an air supply connected thereto, and including a rotatable closure for said open top communicatively connected to the casing and to the lower end of the flexible section, and rotatable by said flexible section, for maintaining communication between the conduit and the casing during rotation of the turret.

6. The combination with a rotatable gun turret in aircraft provided with a seat secured to the turret for rotation therewith, of a system for supplying air to the turret, comprising: a conduit having its upper portion secured for bodily rotation with the turret, provided with a nozzle mounted on the turret forwardly of the seat for discharging air into the turret and including a lower flexible pipe section and an intermediate offset portion extending along one side of the seat; means for supporting said offset portion at one side of and for rotation with the turret; and a casing provided with an open top stationarily supported on the aircraft under the turret, having an air supply connected thereto, and including a rotatable closure for said open top communicatively connected to the casing and to the lower end of the flexible pipe section and rotatable by said flexible section for maintaining communication between the conduit and the casing during rotation of the turret.

DONALD D. WALLER.

REFERENCES CITED

The following references are of record in the file of this patent:

UNITED STATES PATENTS

| Number | Name | Date |
|---|---|---|
| 245,689 | Young | Aug. 16, 1881 |
| 381,008 | Gould | Apr. 10, 1888 |
| 1,263,912 | Lyle | Apr. 23, 1918 |
| 1,358,314 | Jezova | Nov. 9, 1920 |
| 1,940,244 | Carlstedt | Dec. 19, 1933 |
| 2,099,377 | Smellie | Nov. 16, 1937 |
| 2,162,019 | Johnson | June 13, 1939 |
| 2,330,322 | Williams, Jr. | Sept. 28, 1943 |